(12) United States Patent
Yamashita

(10) Patent No.: US 8,104,141 B2
(45) Date of Patent: Jan. 31, 2012

(54) ANGLE-ADJUSTABLE HINGE

(75) Inventor: Tadanobu Yamashita, Sakai (JP)

(73) Assignee: Koyo Giken Kabushiki Kaisha, Sakai-shi (JP)

( * ) Notice: Subject to any disclaimer, the term of this patent is extended or adjusted under 35 U.S.C. 154(b) by 565 days.

(21) Appl. No.: 12/330,990

(22) Filed: Dec. 9, 2008

(65) Prior Publication Data

US 2009/0288270 A1 Nov. 26, 2009

(30) Foreign Application Priority Data

May 23, 2008 (JP) ................................ 2008-135829

(51) Int. Cl.
*E05D 7/06* (2006.01)

(52) U.S. Cl. ................ 16/239; 16/249; 16/296; 16/324; 16/327; 16/334; 16/354; 297/356; 297/367 R; 297/364 P

(58) Field of Classification Search ............... 16/235, 16/239, 241, 249, 287, 296, DIG. 29, 321, 16/324, 326–327, 334, 354; 182/163; 297/356, 297/367 R, 367 P; 403/91–94, 96–98
See application file for complete search history.

(56) References Cited

U.S. PATENT DOCUMENTS

| | | | | | |
|---|---|---|---|---|---|
| 3,586,355 | A | * | 6/1971 | Magi | 403/91 |
| 3,887,232 | A | * | 6/1975 | Dinkel | 297/367 R |
| 3,961,497 | A | * | 6/1976 | Cohen | 464/109 |
| 4,082,352 | A | * | 4/1978 | Bales et al. | 297/364 |
| 4,087,885 | A | * | 5/1978 | Gillentine | 16/325 |
| 4,890,950 | A | * | 1/1990 | Yoo | 403/96 |
| 5,146,808 | A | * | 9/1992 | Hoshino | 74/531 |
| 6,092,334 | A | * | 7/2000 | Kim | 49/8 |
| 6,474,740 | B1 | * | 11/2002 | Kondo et al. | 297/367 R |
| 6,565,156 | B1 | * | 5/2003 | Yamashita et al. | 297/354.12 |
| 6,711,780 | B2 | * | 3/2004 | Lee | 16/326 |
| 6,926,363 | B2 | * | 8/2005 | Yamashita | 297/366 |
| 6,993,808 | B1 | * | 2/2006 | Bennett et al. | 16/334 |
| 2005/0268434 | A1 | * | 12/2005 | Burbrink et al. | 16/324 |

FOREIGN PATENT DOCUMENTS

JP 59-20118 Y2 6/1984
* cited by examiner

*Primary Examiner* — Victor Batson
*Assistant Examiner* — Roberta Delisle
(74) *Attorney, Agent, or Firm* — Kratz, Quintos & Hanson, LLP

(57) ABSTRACT

An angle-adjustable hinge in which a pair of floating wedge members are disposed as to be rotation symmetric for 180° around a first axis as an axis of symmetry, and each of wedge faces of four wedge-shaped window portions is serially formed on an arc around a second axis as a center, eccentric from the first axis and rotation symmetric for every 90° around the first axis as the axis of symmetry.

7 Claims, 7 Drawing Sheets

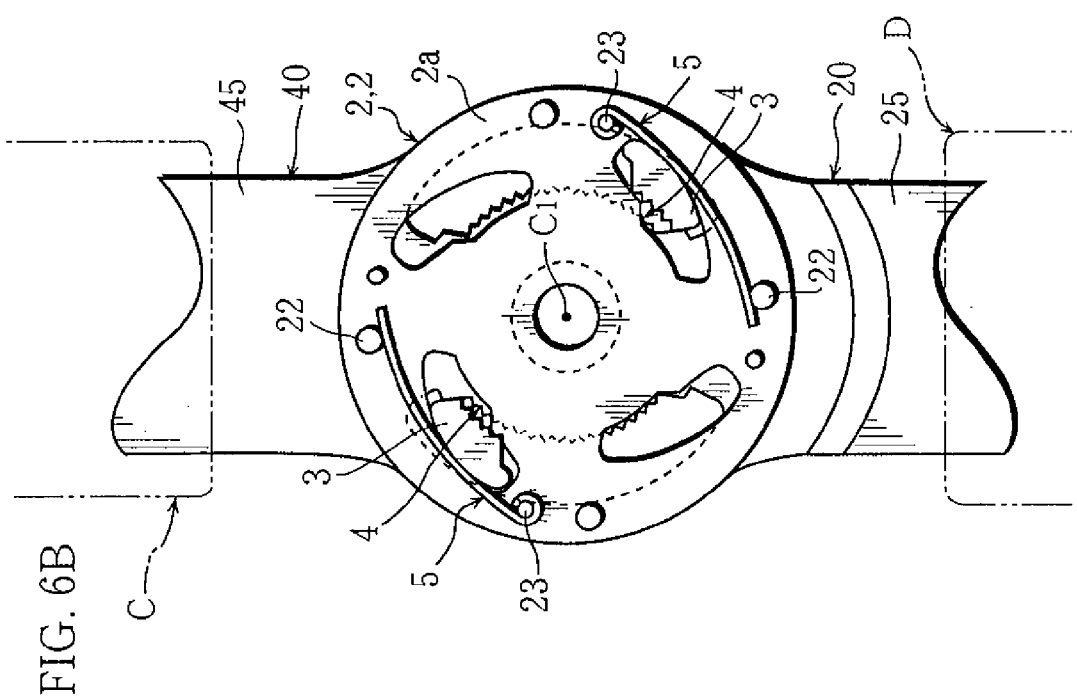
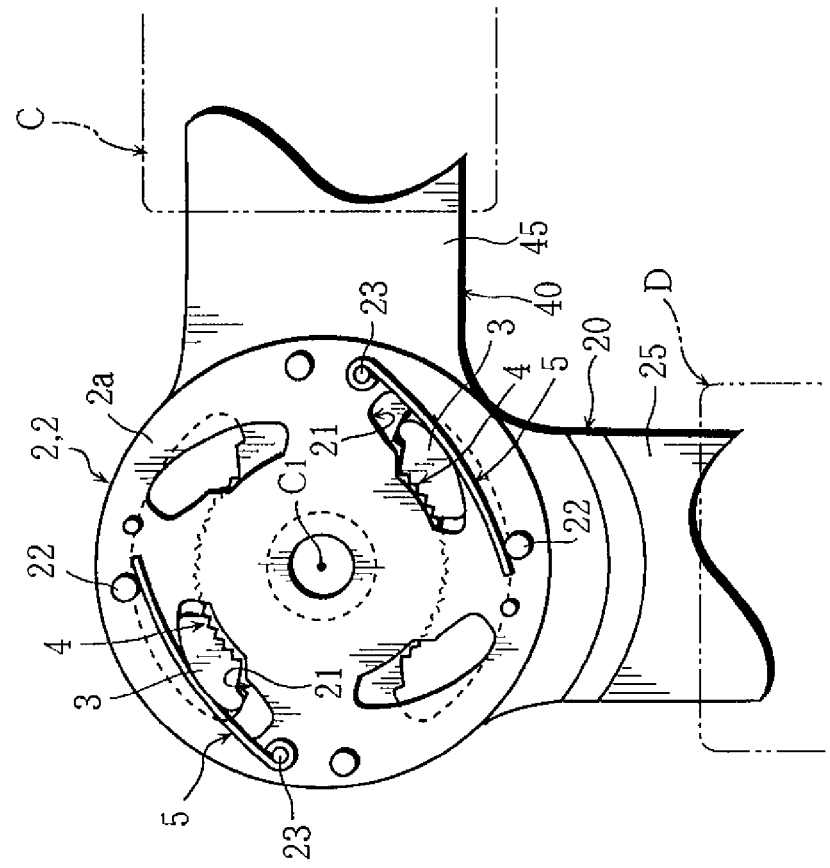

ANGLE-ADJUSTABLE HINGE

BACKGROUND OF THE INVENTION

1. Field of the Invention

This invention relates to an angle-adjustable hinge with which an angle formed by members on one side and another side can be set to a desired angle.

2. Description of the Related Art

Conventionally, as shown in Japanese utility model provisional publication number S59-20118, as an angle-adjustable hinge which can adjust oscillation angle as to set an angle of a back portion of a chair and a seat portion as a user desires, an hinge that holds the angle of the back portion to a desired position and restrict an oscillation in an inclining direction of the back portion by engagement of a toothed piece to a gear portion is known.

When the angle of the back portion is held, stress on the engaged portion is reduced by forming the gear portion and the toothed piece large because the load of a person on the back portion is concentrated on the gear portion and the toothed piece.

However, attachment positions of the angle-adjustable hinge having large gear portion and toothed piece are limited. And, when the hinge is embedded in a sofa or a chair, a protrusion is generated and design of the furniture is spoiled. And, simply making the gear portion thin, the gear portion may not be able to support the load of the person, and slip or damage may be generated on the engagement portion.

Therefore, it is an object of the present invention to provide a small and thin angle-adjustable hinge with which the load is sufficiently supported.

BRIEF DESCRIPTION OF THE DRAWINGS

The present invention will be described with reference to the accompanying drawings, in which:

FIG. 6A is a side view of a principal portion for explanation of functions;

FIG. 6B is a side view of the principal portion for explanation of functions.

DESCRIPTION OF THE PREFERRED EMBODIMENTS

Preferred embodiments of the present invention will now be described with reference to the accompanying drawings.

Figure 1:
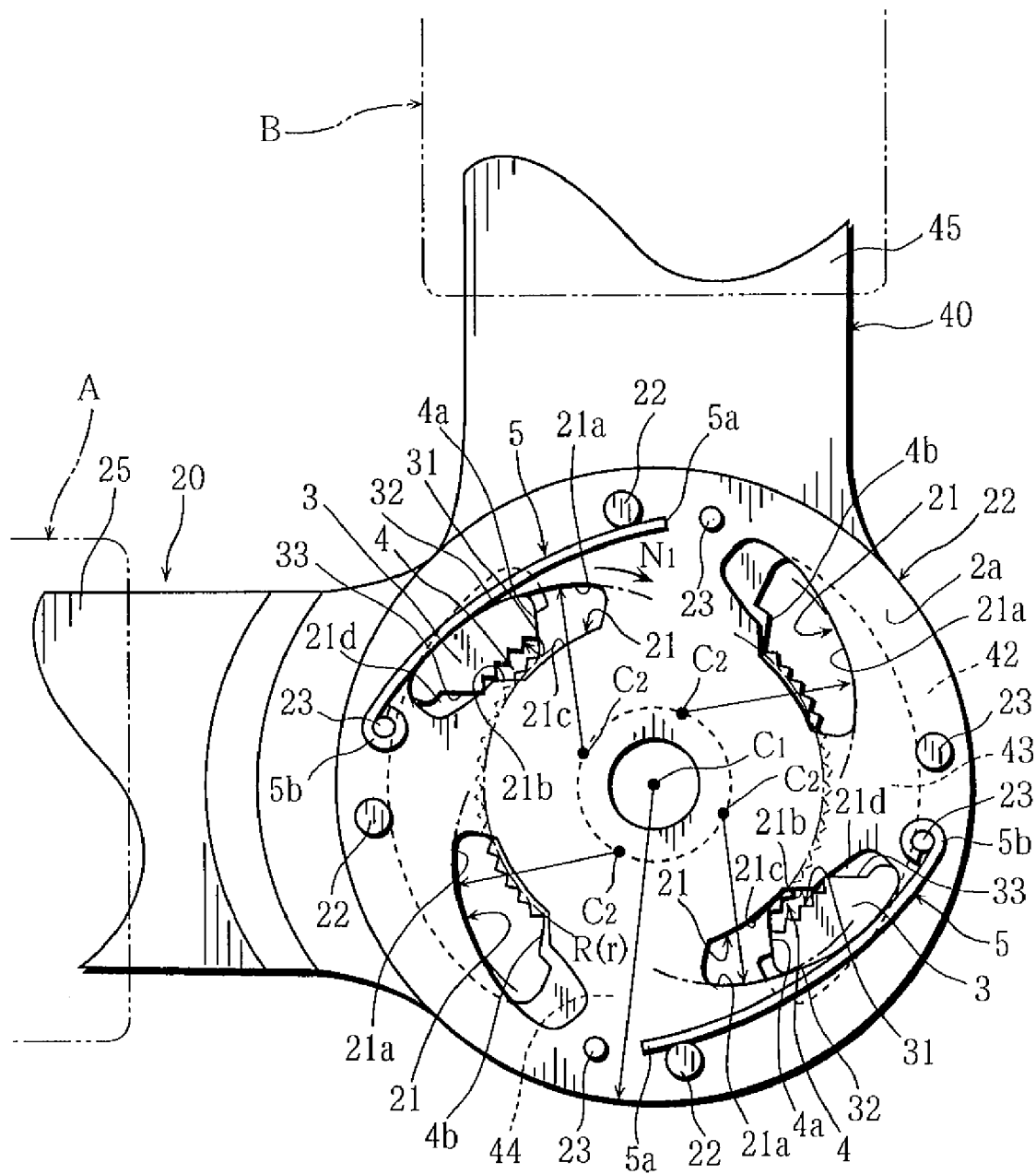
FIG. 1 is a side view of a principal portion showing a first embodiment of an angle-adjustable hinge of the present invention.
Figure 2:
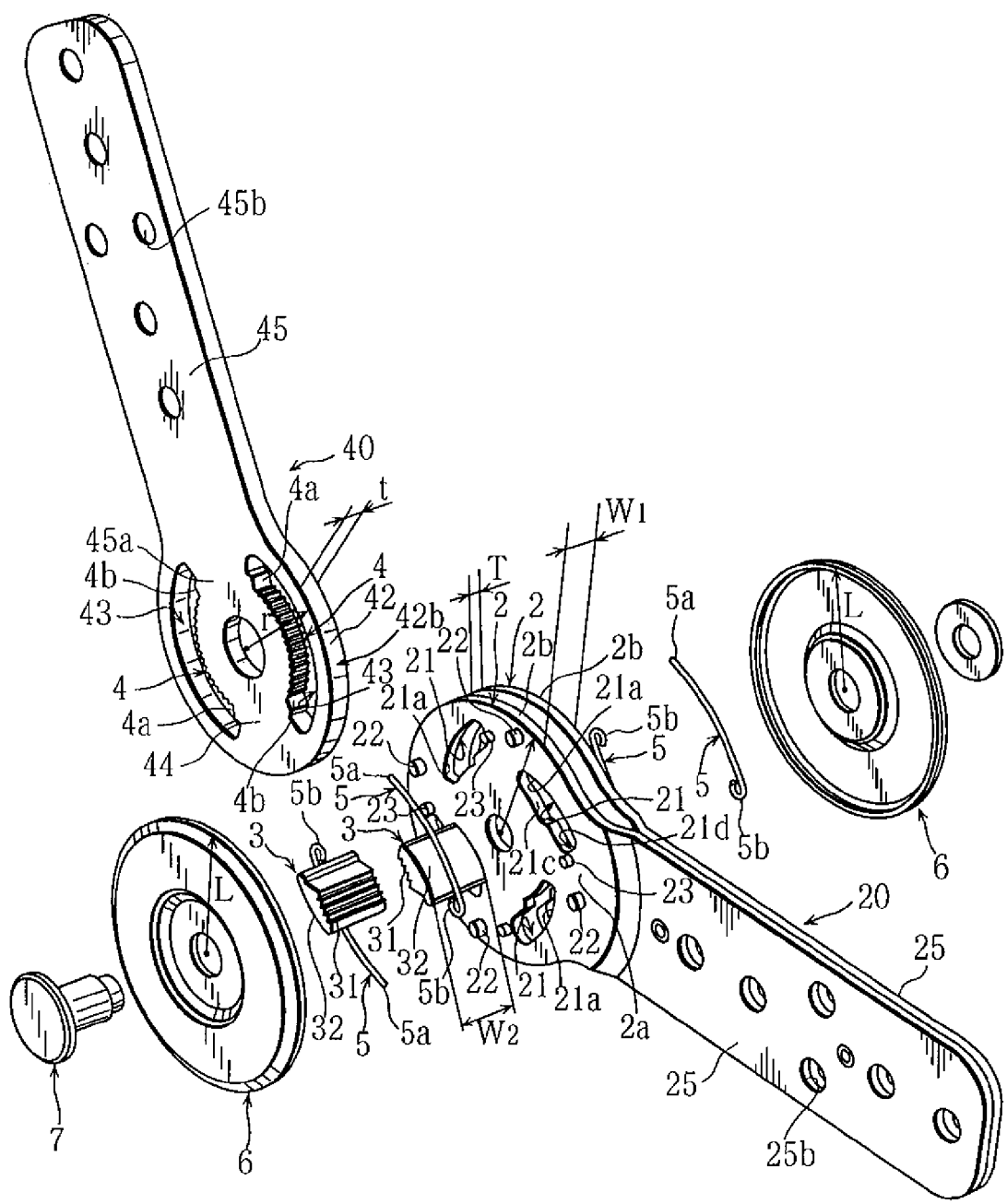
FIG. 2 is an exploded perspective view.
Figure 3:
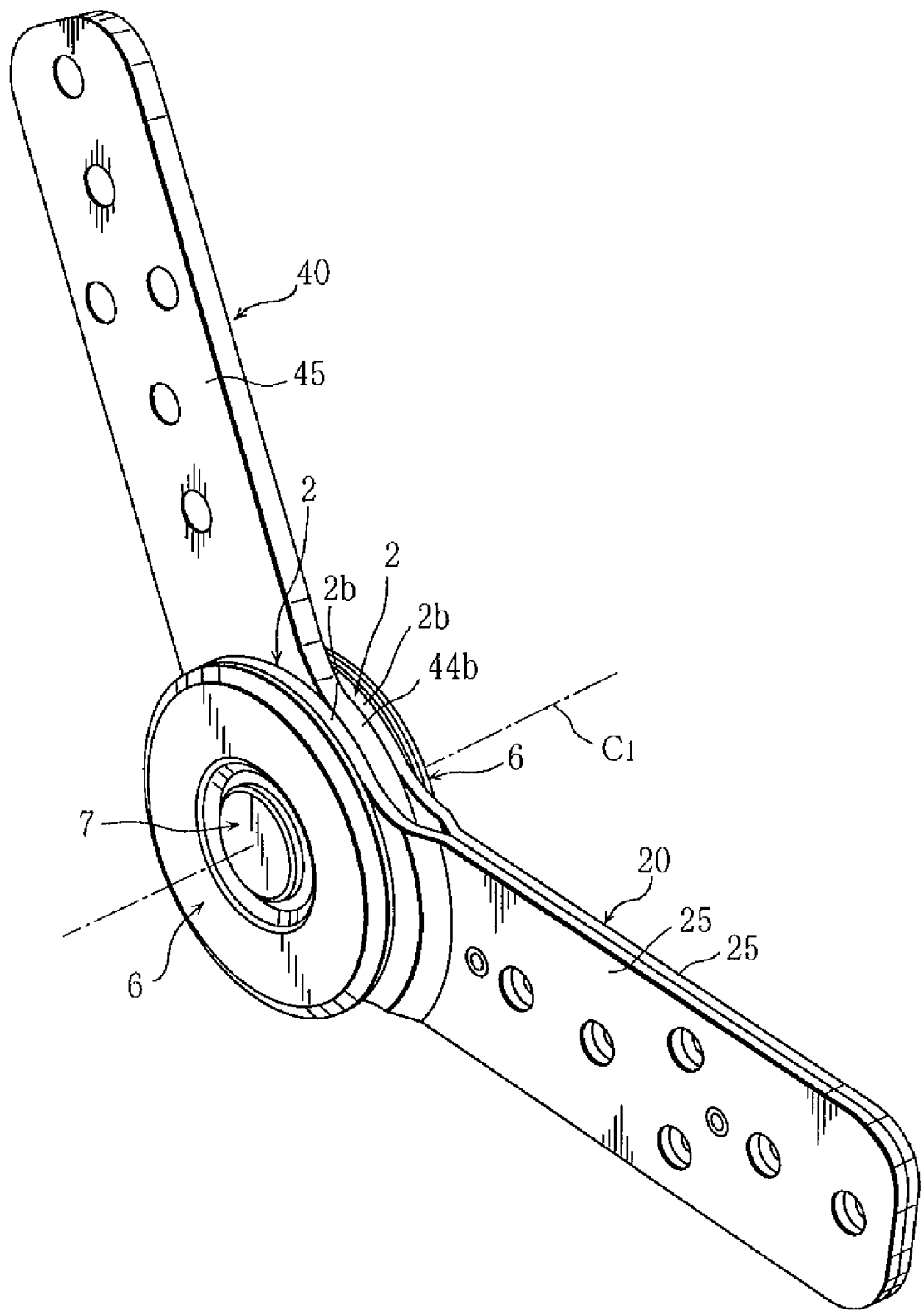
FIG. 3 is a perspective view.
Figure 4:
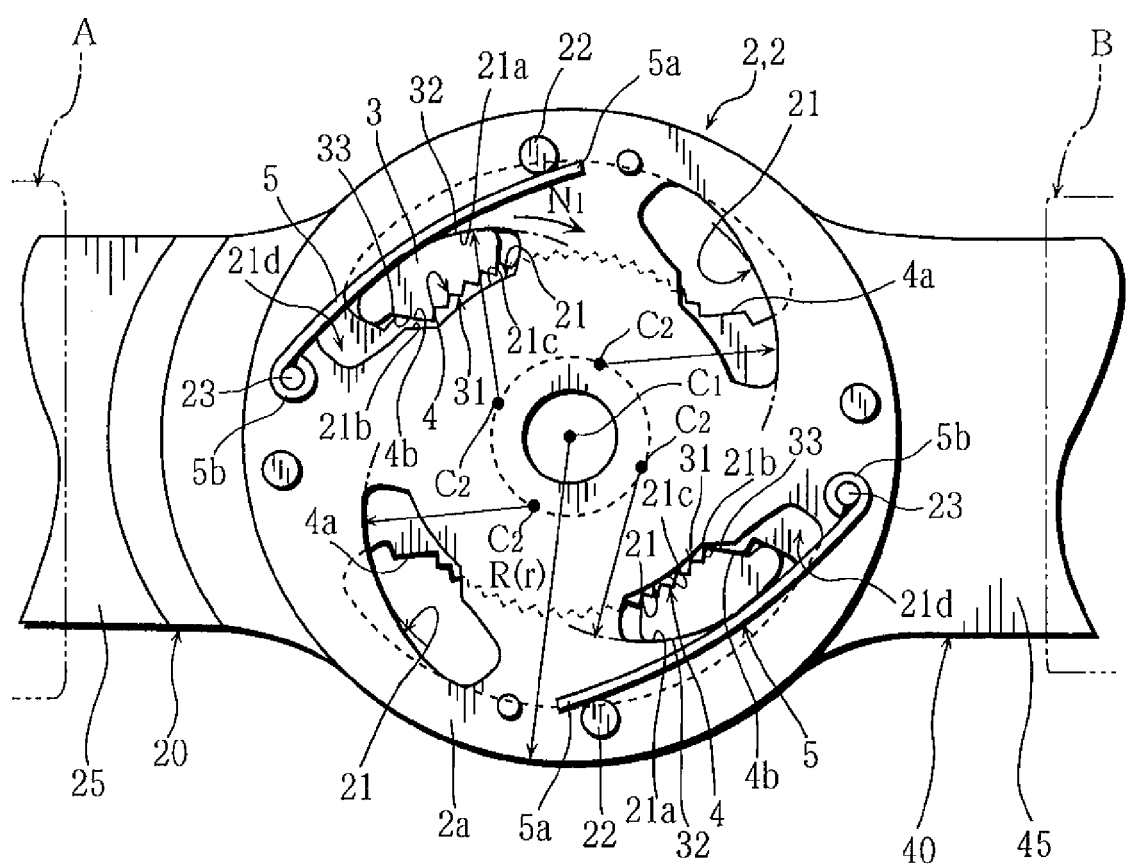
FIG. 4 is a side view of a principal portion for explanation of functions.

FIG. 1 is a side view of a principal portion showing a first embodiment of an angle-adjustable hinge of the present invention. FIG. 2 is an exploded perspective view. FIG. 3 is a perspective view of an assembled state. FIG. 4 is a side view of a principal portion showing a state after an oscillation.

In the present invention, figures observed in a first axis $C_1$ direction is called side views. And, "rotationally symmetric position of which axis of rotation is the first axis $C_1$" may be called simply "rotationally symmetric position" for simple explanation.

The angle-adjustable hinge of the present invention is, for example, used as a hinge with which inclination angle of a back portion and armrest can be adjusted.

Other than chairs, massage chairs, headrests, footrests, etc., the hinge may be used to oscillatably connect two members such as in opening and closing doors.

In FIGS. 1 through 4, the hinge is provided with a pair of parallel wall portions 2 formed circular of which center is the first axis C1 the center of oscillation (pivot) of members forming the angle to be adjusted, four wedge-shaped window portions 21 disposed rotationally symmetric for every 90° around the first axis $C_1$ as the axis of symmetry, a pair of floating wedge members 3 disposed rotationally symmetric for 180° around the first axis $C_1$ as the axis of symmetry, a pair of gear portions 4 disposed rotationally symmetric for 180° around the first axis $C_1$ as the axis of symmetry, spring wires 5 elastically pushing the floating wedge members 3 to the gear portions 4, cover members 6 holding the wail portions 2 from the first axis $C_1$ directions, and an attachment shaft 7 to concentrically pivot the wall portions 2, the gear portions 4, and the cover members 6.

Each of the pair of wall portions 2 is formed as a circular plate. The four wedge-shaped window portions 21 penetrate each of the pair of wall portions 2 on rotationally symmetric positions for every 90° around the first axis $C_1$ as the axis of symmetry, a contact pin portion 22 which contacts an end 5a of the spring wire 5, and an axis pin portion 23, to which another end 5b of the spring wire 5 is supported, are protruding from a position near the both ends in a peripheral direction of each of the wedge-shaped window portion 21 on an outer side faces 2a (the outer faces in the first axis $C_1$) of the wall portions 2. And, a central hole is formed concentrically with the first axis $C_1$.

The interval between the pair of wall portions 2 is set to be an interval dimension T, in which the gear portion 4 can be disposed, serves as a case portion which stores the gear portion 4. A plate-shaped attachment piece portion 25 protrudes from the wall portion 2 in an outer radial direction of the first axis $C_1$. The wall portions 2 and the attached portions 25 are facing and the attached portions 25 are unitedly fixed by face contact and spot welding. The attached portion 25 has attachment through holes 25b for attachment of members to be oscillated. The unitedly fixed attached portion 25 form an attachment arm portion.

That is to say, the present invention is provided with an oscillation case member 20, in which the pair of wall portions (case portion) being able to include the gear portion 4 and the attachment piece portion (the attachment arm portion) to which the member to be oscillated is attached, by fixing two plate-shaped members having the wall portion 2 and the attachment piece portion 25. And, the contact pin portion 22 and the axis pin portion 23 are formed by press-fitting of pin members into the wall portion 2.

In the wedge-shaped window portion 21, an arc-shaped wedge face 21a is formed on an outer side when the side near the first axis $C_1$ is defined as an inner side. The wedge face 21a is formed serially as to have a second axis $C_2$, eccentric from the first axis $C_1$ and rotation symmetric for every 90° around the first axis $C_1$ as the axis of symmetry, as the center, and as to come close to the gear portion 4. That is to say, the interval between the wedge face 21a and the gear portion 4 becomes gradually small (diminishes) as being formed in an arrow $N_1$ direction shown in FIG. 1. And, a floating staged portion 21b is formed as to protrude from an arc face 21c and guide the floating wedge member 3. And, the wedge-shaped window portion 21 has a retreat space 21d to store the floating wedge member 3 when not engaged to the gear portion 4 (unengaged state). The arrow $N_1$ direction is the same rotational direction as the peripheral direction in which the oscillation of the gear portion 4 should be restricted.

The floating wedge members 3 are disposed to be rotation symmetric for 180° a round the first axis $C_1$ as the axis of symmetry, and inserted to the wedge-shaped window portions 21 on the positions rotationally symmetric for 180°. The floating wedge member 3 is formed to have a second width dimension $W_2$ slightly larger than the first width dimension $W_1$ of the wall portions 2. The floating wedge member 3 partially (on both end sides) protrudes from the outer side faces 2a of the wall portions 2 when inserted to the wedge-shaped window portion 21.

And, the floating wedge member 3 is disposed as to move within the wedge-shaped window portion 21. One side of the floating wedge member 3 is formed into a toothed face 31 to engage to the gear portion 4. Another side of the floating wedge member 3 is formed into an arc-shaped contact face 32 to contact the wedge face 21a.

The contact face 32 is formed as to be guided by the wedge face 21a to place the floating wedge member 3 between the gear portion 4 and the wedge face 21a when the gear portion 4 oscillates and the floating wedge member 3 is moved by the engagement of the toothed face 31 to the gear portion 4. The floating wedge member 3 restricts the oscillation of the gear portion 4. That is to say, the floating wedge member 3 restricts the oscillation of the gear portion 4 in one direction by the engagement of the toothed face 31 to the gear portion 4 and the contact of the contact face 32 with the wedge face 21a. And, the floating wedge member 3 has a guiding slope 33 which contacts the floating staged portion 21b and guides itself in a direction parting from the gear portion 4. The guiding slope 33 is formed on a rear edge portion of the toothed face 31.

Each of the pair of gear portions 4 is formed arc-shaped of which center is the first axis $C_1$. And, the pair of gear portions 4 is formed as a plate having teeth on the outer side and pivoted between the pair of wall portions 2 as to oscillate around the first axis $C_1$. The gear portions 4 are formed on positions in rotation symmetry for 180° of which axis of symmetry is the first axis $C_1$. A plate-shaped attachment piece portion 45 protrudes from the pair of gear portions 4 in an outer radial direction of the first axis $C_1$. And, the pair of gear portions are surrounded by a ring protection portion 42, formed circular of which center is the first axis $C_1$, through escape window portions 43 to which the floating wedge member 3 is inserted. And, a connecting portion 44 to connect the ring protection portion 42 protrudes from the opposite side to the protrusion of the attachment piece portion 45.

That is to say, the present invention is provided with an oscillation gear member 40 of a plate in which the gear portions 4, the ring protection portion 42, the escape window portions 43, the connecting portion 44, and the attachment piece portion 45 are unitedly formed.

The gear portions 4, like a beam supported on the both ends having high strength, are supported by a base end portion 45a of the attachment piece portion 45 and the connecting portion 44 on the inner side of the ring protection portion 42. This configuration hardly generates stress concentration on the base end portion 45a. And, a central through hole is formed concentrically with the first axis $C_1$. The attachment piece portion 45 has plural attachment through holes 45b to which the member to be oscillated is attached. And, a push-in protrusion 4a, for pushing the floating wedge member 3 to the retreat space 21d of the wedge-shaped window portion 21, is formed on an end side (an end side of the engagement) of the gear portion 4. And, a push-out protrusion 4b, for pushing out the floating wedge member 3 stored within the retreat space 21d, is formed on another end portion (a beginning side of the engagement) opposite to the end side of the gear portion 4 on which the push-in protrusion 4a is formed.

A second radius dimension r of the ring protection portion 42 on outer periphery of which center is the first axis $C_1$ is set to be the same as a first radius dimension R of the pair of wall portions 2 on outer periphery of which center is the first axis $C_1$.

And, a thickness dimension t of the ring protection portion 42 in the first axis $C_1$ direction is set to be approximately same as the interval dimension T between the wall portions 2. However, there is micro gap dimension generated by tolerance (for working, assembly, and slidability).

First peripheral faces 2b of the wall portions 2 and second peripheral faces 44b of the ring protection portion 42 are formed to make a united face (having only slight difference and gaps within the assembly and working tolerance). Foreign matter is prevented from getting between the wall portions and the gear portion 4. The engaged portion and sliding portion of the gear portion 4 and the floating wedge member 3 are protected.

The spring wire 5 is cut into a predetermined length and formed straight. The end 5a is formed straight, and the other end 5b is bent into a hook or circle as to fit to the axis pin portion 23.

The spring wire 5 is made arc when touched by the contact face 32 of the floating wedge member 3 exposed on (protruding from) the outer faces 2a of the wall portions 2. The recovering force from the arc to the straight configuration is used as elastic pushing force. That is to say, the spring wire 5 is disposed as to elastically Push the floating wedge member 3 toward the gear portion 4. And, two units of the spring wire 5 are provided for one floating wedge member 3 through the wall portions 2 in the first axis $C_1$. Four units of the spring wire 5 are provided in all.

Each of the cover members 6 is formed in a thin circle (disc) as to cover the outer face 2a of the wall portion 2. A third radius dimension L on the periphery is set to be the same as the first radius dimension R and the second radius dimension r. The cover members 6 are disposed as to cover the floating wedge member 3, the spring wire 5, and the gear portion 4 exposed from the wedge-shaped window portion 21 on the both sides in the first axis $C_1$ direction. The cover members 6 protect the floating wedge member 3, the spring wire 5, and the gear portion 4 exposed from the wedge-shaped window portion 21 against foreign matters. The exposed working portion (the gear portion 4, the floating wedge member 3, the spring wire 5) does not damage fabric and cushion of sofas. And, a through hole is concentrically formed with the first axis $C_1$.

Next, operation method (function) of the first embodiment is described.

First, with FIGS. 1, 4, and 5A through 5F, explanation is made of a case in which the attachment piece portion 25 of the oscillation case member 20 is attached to a seat A on the fixed side to a sofa, the attachment piece portion 45 of the oscillation gear member 40 is attached to a back B on the oscillation side of the sofa, the back B in a horizontal state, shown in FIG. 4 where the seat A and the back B are horizontal, is oscillated to be upright, and reclining (inclination) angle of the back is adjusted.

Figure 5A:
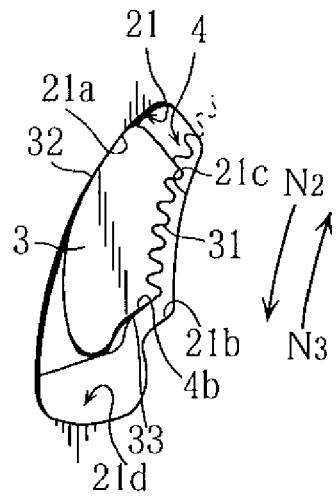
FIG. 5A is a side view of a principal portion for explanation of functions.
Figure 5B:
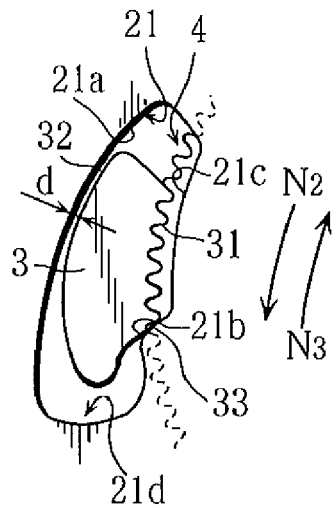
FIG. 5B is a side view of the principal portion for explanation of functions.
Figure 5C:
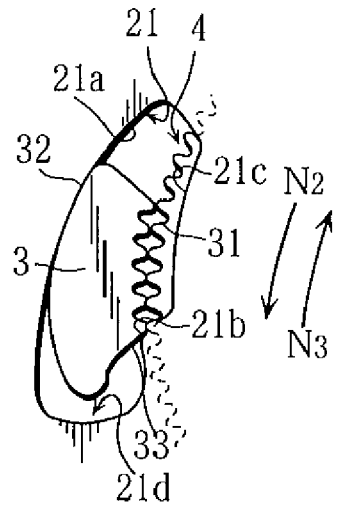
FIG. 5C is a side view of the principal portion for explanation of functions.

In FIGS. 4 and 5A, the floating wedge member 3 engages to the gear portion 4, and the contact face 32 contacts the wedge face 21a of the wedge-shaped window portion 21 to stop the oscillation of the gear portion 4 by wedge work. When the back B is oscillated in standing direction, the gear portion 4 oscillates in a direction to make the wedge face 21a and the gear portion 4 apart (in an arrow $N_2$ direction). As shown in FIG. 5B, the contact face 32 of the floating wedge member 3 is departed from the wedge face 21a to make a slight gap d. When the gear portion 4 (the back B) is further oscillated, the guiding slope 33 of the floating wedge member 3 contacts the floating staged portion 21b of the wedge-shaped window portion 21, and the engagement between the floating wedge member 3 and the gear portion 4 is released as shown in FIG. 5C. The toothed face 31 of the floating wedge member 3, clicking, goes over the gear portion 4 as to be fended off. When the oscillation of the gear portion 4 (the back B) is stopped on a desirable position for the user, the toothed face 31 engages to the gear portion 4 by the spring wire 5 (not shown in FIGS. 5A through 5F). The gear portion 4 (the back B) slightly oscillates until the contact face 32 of the engaged floating wedge member 3 contacts the wedge face 21a in an arrow $N_3$ direction opposite to the arrow $N_2$ direction. After the slight oscillation in the arrow Na direction, the oscillation of the gear portion 4 (the back B) is restricted by the wedge work. The back B is held with the desired reclining (inclination) angle to the seat A.

Figure 5D:
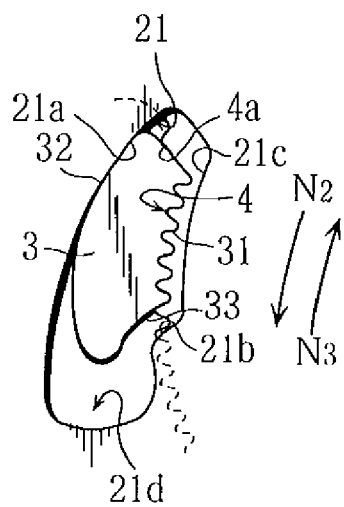
FIG. 5D is a side view of the principal portion for explanation of functions.
Figure 5E:
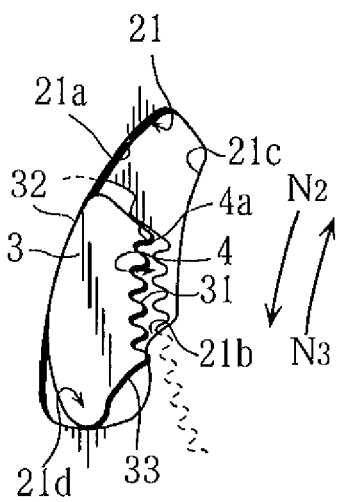
FIG. 5E is a side view of the principal portion for explanation of functions.
Figure 5F:
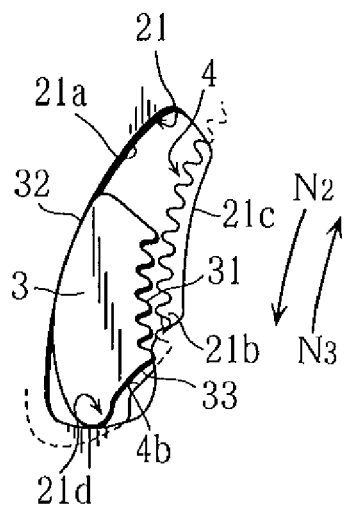
FIG. 5F is a side view of the principal portion for explanation of functions.

And, as shown in FIG. 5D, the push-in protrusion 4a of the gear portion 4 contacts the floating wedge member 3, and the floating wedge member 3 presses the gear portion 4 when the gear portion 4 (the back B) is oscillated for a predetermined amount (to the end portion of the gear portion 4). The guiding slope 33 slides on the floating staged portion 21b, the floating wedge member 3 is guided (lead) to and stored in the retreat space 21d formed on the rear end of the wedge-shaped window portion 21 as shown in FIG. 1 and FIG. 5E. The oscillation of the gear portion 4 in the arrow $N_2$ direction is restricted. The gear Portion 4 becomes able to freely oscillate in the arrow $N_2$ direction when the floating wedge member 3 is stored in the retreat space 21d and the engagement is released. The push-out protrusion 4b of the gear portion 4 contacts the floating wedge member 3, and the floating wedge member 3 is pushed out of the retreat space 21d when the gear portion 4 (the back B) is oscillated for a predetermined amount (to the beginning portion of the gear portion 4) in the arrow N direction. The floating wedge member 3 engages to the gear portion 4 and restricts the oscillation of the gear portion 4 (the back B) in the arrow $N_3$ direction by wedge work. The state of FIG. 5A is made again, the oscillation of the gear portion 4 (the back B) in the arrow $N_3$ direction is made possible, and the back B can be maintained (held) on a desired position. That is to say, the floating wedge member 3 restricts the oscillation of the gear portion 4 in one direction (the arrow $N_3$ direction) by the engagement of the toothed face 31 to the gear and the contact of the contact face 32 with the wedge face 21a.

When the user leans on the back B of the desired reclining (inclination) angle, force (pressure) is generated on the engaged portion of the toothed face 31 of the floating wedge member 3 and the gear portion 4. This force is dispersed on the pair of floating wedge members 3 and the pair of gear portions 4. The load (pressure) working on the wedge face 21a of the wedge-shaped window portions 21, the floating wedge members 3, and the gear portions 4 is made half in comparison with a case that one unit of the floating wedge member 3, one unit of the gear portion 4, and one unit of the wedge-shaped window portion 21 are provided. With this construction, the load can be sufficiently supported even the floating wedge member 3 and the gear portion 4 are small and thin.

The pair of floating wedge members 3 hold the pair of gear portions 4. If the gear portions 4 are made oscillate by the load, one of the floating wedge members 3 escapes in a direction to release the engagement to one of the gear portions 4. The escaping force will let the other floating wedge member 3, on the position of rotation symmetry for 180°, bite to the gear portion 4 through the wail portion 2. The floating wedge member 3 is not departed from the gear portion 4 by the load, and the engagement state is always kept when the load is supported. And, equal load (pressure) is generated on the position of rotation symmetry for 180° and extreme stress concentration on the wedge-shaped window portions 21, the floating wedge members 3, and the gear portions 4 is prevented. The wedge-shaped window portions 21, the floating wedge members 3, and the gear portions 4 are made small and thin. And, each of the floating wedge members 3, and each of the gear portions 4 smoothly contacts and parts from. If the gear portion 4 escapes as to depart from one of the floating wedge members 3, the escape is restricted by the other of the floating wedge members 3 on the position of rotation symmetry for 180°.

The ring protection portion 42 protects members within the wall portions 2. Rags of cushion member of the sofa and dust are prevented from intruding to the gear portions 4, the engagement portion of the gear portions 4 and the floating wedge members 3, and the contact and sliding portions of the floating wedge members 3 and the wedge-shaped window portions 21.

Fabrics and cushion are prevented from being entangled to the hinge when the hinge is oscillated (when the reclining angle is adjusted) because the peripheral face 2b of the wall portion 2 and the peripheral face 42b of the ring protection portion 42 are unitedly making one surface. And, cushion and fabrics are prevented from being damaged inside the sofa.

Stress concentration on the base end portion 45a of the attachment piece portion 45 (the root portion where the attachment piece portion 45 protrudes from the gear portions 4) is prevented by the ring protection portion 42 surrounding and connected to the pair of gear portions 4.

And, the toothed face 31 is engaged to the gear portion 4 by the outer side face 2a as a guiding face without dislocation when the floating wedge member 3 is elastically pushed on the both sides because the spring wire 5 is disposed on both of the outer side faces 2a of the wall portions 2. The interval dimension T can be set smaller because the spring wire 5 is disposed on the outer side of the wall port ions 2. The oscillation case member 20 and the oscillation gear member 40 can be made thin.

And, in FIG. 1 and FIG. 4, the floating wedge members 3 restrict the oscillation from the bent state to the straight state. When the floating wedge members 3 are moved to the wedge-shaped window portions 21 where the floating wedge members 3 are not inserted in FIG. 1 and FIG. 4 (when each of the floating wedge members 3 is respectively inserted to each of the wedge-shaped window portions 21 disposed on the positions of rotation symmetry for 90° of which axis of symmetry is the first axis $C_1$), the oscillation from the straight state to the bent (inclined) state is restricted, and switched to adjustable state for the oscillation (reclining) angle.

For example, when the attachment piece portion 25 of the oscillation case member 20 is attached to the side wall portion D on the fixed side of the sofa and the attachment piece portion 45 of the oscillation gear member 40 is attached to the armrest portion C on the oscillatable side of the sofa, the reclining angle of, the armrest portion C becomes adjustable from the state of FIG. 6A, where the side wall portion D is upright and the armrest portion C is horizontal, to the state of FIG. 6B where the armrest portion C is rising. Although the armrest portion C (the oscillation gear member 40) receives load from a person sitting on the sofa and leaning toward an outer direction of the sofa, the oscillation of the armrest portion C (the gear portion 4) is restricted by the floating wedge member 3.

The direction of restriction and starting posture of the angle adjustment are switched by selection of two wedge-shaped window portions 21 on the positions in rotation symmetry for 180° among the four wedge-shaped window portions 21 on the positions in rotation symmetry for every 90° to insert (transfer) the floating wedge members 3.

In other words, the switching is conducted between the state shown in FIG. 1 and FIG. 4, where the starting posture for angle adjustment is straight and the reclining (oscillation) angle can be set until the hinge is folded to be L-shaped, and the state shown in FIG. 6A where the starting posture is inverted L-shaped and the reclining angle can be set until the hinge is made straight.

Further in other words, in case that the oscillation case member 20 is fixed to be vertical, the switching is conducted between the state where the starting posture is inverted L-shaped as shown, in FIG. 6A and the state where the starting posture is upright straight (as FIG. 4 is inverted anticlockwise for 90°).

That is to says the transfer of the floating wedge members 3 can correspond to various oscillating portions such as backs of sofas, armrests, headrests, etc.

Figure 7:
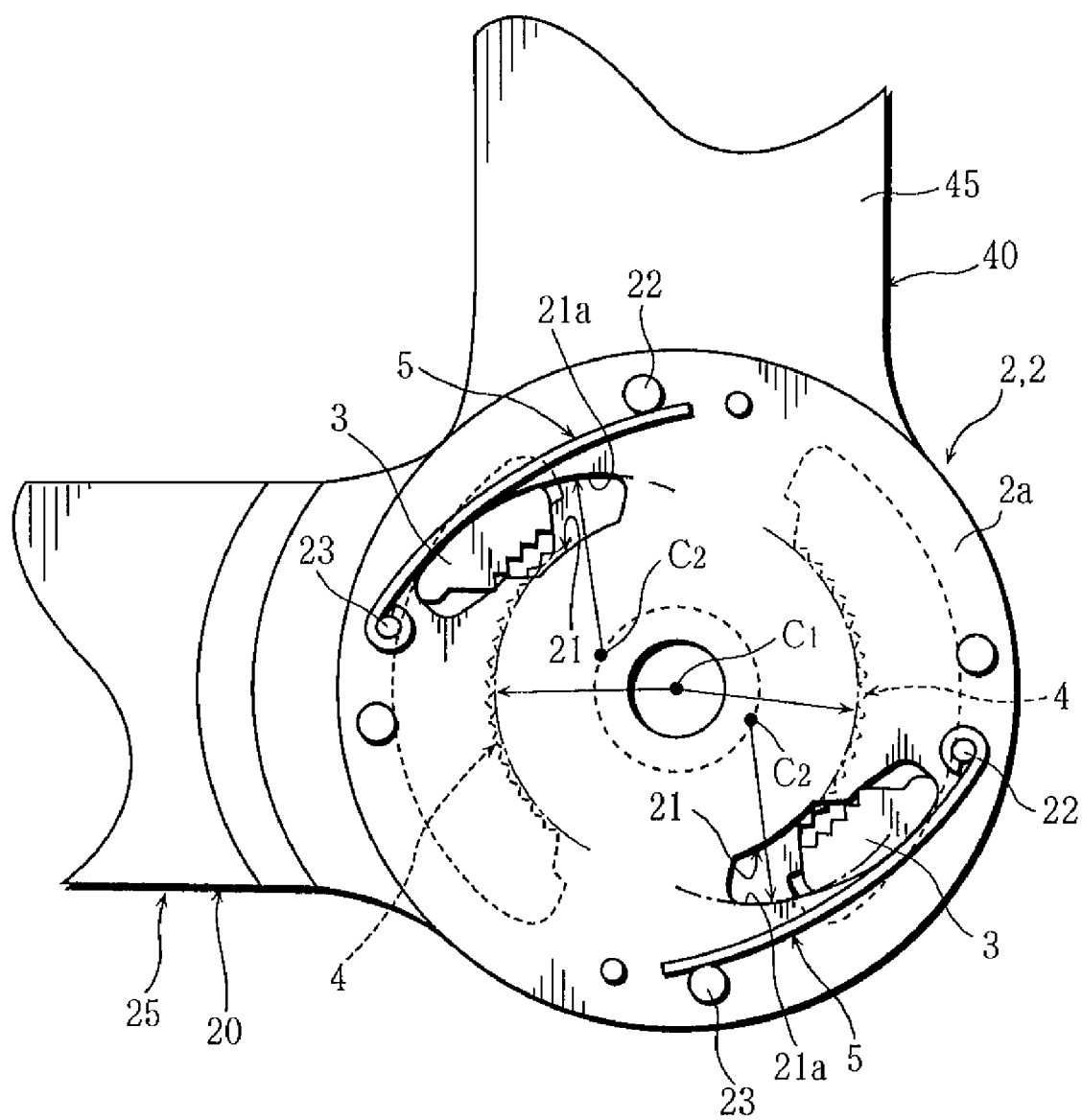
FIG. 7 is a side view of the principal portion of a second embodiment.

Next, a second embodiment is shown in FIG. 7.

The embodiment is provided with a pair of wall-portions 2, a pair of gear portions 4, and a pair of floating wedge members 3, and two wedge-shaped window portions 21 are disposed on each of the wall portions 2 on positions in rotation symmetry for 180° of which axis of symmetry is first axis $C_1$. The floating wedge members 3 are respectively inserted to the wedge-shaped window portions 21. The wedge face 21a of the wedge-shaped window portion 21 is formed arc-shaped as to serially have the second axis $C_2$, eccentric from the first axis $C_1$ and rotation symmetric for every 180° around the first axis $C_1$ as the axis of symmetry. Similar to the first embodiment, force (load) working on the gear portion 4 and the floating wedge member 3 is; supported by the pair of gear portions 4 and the pair of floating wedge members 3 disposed on the positions in rotation symmetry for 180°. Pressure is reduced by letting the floating wedge members 3 contact the gear portion 4 as to hold and restrict the oscillation with good balance. Each of the floating wedge members 3 contacts and departs from each of the gear portions 4 to adjust the oscillation angle.

The present invention can be modified. For example, the oscillation case member 20 may be formed by bending one plate member, and screw holes may be formed on the attachment piece portion 25 and the attachment piece portion 45.

As described above, in the present invention, the force (load) working on the gear portion 4 and the floating wedge member 3 is uniformly dispersed and reduced, because the pair of arc-shaped gear portions 4 oscillatable around the first axis $C_1$ and formed outward from the first axis $C_1$ as the center, four wedge-shaped window portions 21 disposed on positions in rotation symmetry for every 90° of which axis of symmetry is the first axis $C_1$ and the pair of floating wedge members 3, disposed movably within the wedge-shaped window portions 21, of which one face side is the toothed face 31 to engage with the gear portion 4 and another face side is the contact face 32 to contact the wedge fade 21a on the outer side of the wedge-shaped window portion 21 to restrict the gear portion 4 to oscillate in a direction, are provided, the pair of floating wedge members 3 are disposed on positions in rotation symmetry for 180° of which axis of symmetry is the first axis $C_1$, and the wedge faces 21a of the four wedge-shaped window portions 21 are formed serially on arcs each of which center is the second axis $C_2$ eccentric from the first axis $C_1$ and on positions in rotation symmetric for every 90° of which axis of symmetry is the first axis $C_1$. And, the gear portion 4 and the floating wedge member 3 and the entire angle-adjustable hinge can be small and thin. The floating wedge members 3 contact and hold the gear portions 4 to restrict the oscillation with good balance. The load is uniformly working and certainly supported. Durability of the hinge is improved. The direction of the oscillation to be restricted is switchable. The starting posture, in which the angle can be adjusted, can be switched for 90°. And, the hinge can correspond to various oscillation portions.

And, the force (load) working on the gear portion 4 and the floating wedge member 3 is uniformly dispersed and reduced, because the pair of arc-shaped gear portions 4 oscillatable around the first axis $C_1$ and formed outward from the first axis $C_1$ as the center, two wedge-shaped window portions 21 disposed on positions in rotation symmetry for 180° of which axis of symmetry is the first axis $C_1$, and the pair of floating wedge members 3, disposed movably within the wedge-shaped window portions 21, of which one face side is the toothed face 31 to engage with the gear portion 4 and another face side is the contact face 32 to contact the wedge face 21a on the outer side of the wedge-shaped window portion 21 to restrict the gear portion 4 to oscillate in a direction, are provided, the pair of floating wedge members 3 are disposed on positions in rotation symmetry for 180° of which axis of symmetry is the first axis $C_1$, and the wedge faces 21a of the two wedge-shaped window portions 21 are formed serially on arcs each of which center is the second axis $C_2$ eccentric from the first axis $C_1$ and on positions in rotation symmetric for 180° of which axis of symmetry is the first axis $C_1$. And, the gear portion 4 and the floating wedge member 3 and the entire angle-adjustable hinge can be small and thin. The floating wedge members 3 contact and hold the gear portions 4 to restrict the oscillation with good balance. The load is uniformly working and certainly supported. Durability of the hinge is improved.

And, the force (load) working on the gear portion 4 and the floating wedge member 3 is uniformly dispersed and reduced, because the pair of parallel and plate-shaped wall portions 2, the pair of arc-shaped gear portions 4 disposed between the wall port ions 2 and oscillatable around the first axis $C_1$ and formed outward from the first axis $C_1$ as a center, four wedge-shaped window portions 21 disposed on each of the wall portions 2 on positions in rotation symmetry for every 90° of which axis of symmetry is the first axis $C_1$, and the pair of floating wedge members 3, disposed movably within the wedge-shaped window portions 21, of which one face side is the toothed face 31 to engage with the gear portion 4 and another face side is the contact face 32 to contact the wedge face 21a on the outer side of the wedge-shaped window portion 21 to restrict the gear portion 4 to oscillate in a direction, are provided, the pair of floating wedge members 3 are disposed on positions in rotation symmetry for 180° of which axis of symmetry is the first axis $C_1$, and the wedge faces 21a of the four wedge-shaped window portions 21 are formed serially on arcs each of which center is the second axis $C_2$ eccentric from the first axis $C_1$ and on positions in rotation symmetric for every 90° of which axis of symmetry is the first axis $C_1$. And, the gear portion 4 and the floating wedge member 3 and the entire angle-adjustable hinge can be small and thin. The floating wedge members 3 contact and hold the gear portions 4 to restrict the oscillation with good balance. The load is uniformly working and certainly supported. Durability of the hinge is improved. The direction of the oscillation to be restricted is switchable. The starting posture, in which the angle can be adjusted, can be switched for 90°. And, the hinge can correspond to various oscillation portion.

And, the force (load) working on the gear portion 4 and the floating wedge member 3 is uniformly dispersed and reduced, because the pair of parallel and plate-shaped wall portions 2, the pair of arc-shaped gear portions 4 disposed between the wall portions 2 and oscillatable around the first axis $C_1$ and formed outward from the first axis $C_1$ as a center, two wedge-shaped window portions 21 disposed on each of the wall portions 2 on positions in rotation symmetry for 180° of which axis of symmetry is the first axis $C_1$, and the pair of floating wedge members 3, disposed movably within the wedge-shaped window portions 21, of which one face side is the toothed face 31 to engage with the gear portion 4 and another face side is the contact face 32 to contact the wedge face 21a on the outer side of the wedge-shaped window portion 21 to restrict the gear portion 4 to oscillate in a direction, are provided, the pair of floating wedge members 3 are disposed on positions in rotation symmetry for 180° of which axis of symmetry is the first axis $C_1$, and the wedge faces 21a of the two wedge-shaped window portions 21 are formed serially on arcs each of which center is the second axis $C_2$ eccentric from the first axis $C_1$ and on positions in rotation symmetric for 180° of which axis of symmetry is the first axis $C_1$. And, the gear portion 4 and the floating wedge member 3 and the entire angle-adjustable hinge can be small and thin. The floating wedge members 3 contact and hold the gear portions 4 to restrict the oscillation with good balance. The load is uniformly working and certainly supported. Durability of the hinge is improved.

And, strength of the gear portions 4 and the base end portion 45a of the attachment piece portion 45 can be improved, because the oscillation gear member 40, in which the pair of gear portions 4, the attachment piece portion 45 protruding from the pair of gear portions 4, the ring protection portion 42, of which center is the first axis $C_1$, circularly surrounding the pair of gear portions 4 through the escape window portions 43 to which the floating wedge members 3 are inserted, and the connecting portion 44 protruding from the opposite side to the attachment piece portion 45 and connecting the pair of gear portions 4 and the ring protection portion 42, are unitedly formed, is provided. And, durability can be improved. The gear portion 4 can be protected. The hinge can be made easily and economically by press-working. The hinge can be attached to small limited spaces such as inside a sofa.

And, dust intrusion to the pair of wall portions 2 can be prevented, because the wall portions 2 are formed into circular plates of which center is the first axis $C_1$, and the first radius dimension R of the wall portion 2 and the second radius dimension r of the ring protect ion portion 42 are set to be the same. And, malfunction and defect by dust intrusion can be prevented. Sponge of cushion, fabrics, and leather of sofas and chairs can be prevented from being entangled. And, damage on the fabrics and cushion can be prevented.

And, dust intrusion to the pair of wall portions 2 can be prevented, because the interval dimension T of the pair of wall portions 2 and the thickness dimension t of the ring protection portion 42 are set to be the same. And, malfunction and defect by dust intrusion can be prevented. Sponge of cushion, fabrics, and leather of sofas and chairs can be prevented from being entangled. Damage on the fabrics and cushion can be prevented. And, the pair of wall portions 2 can be prevented from yielding to the inner side and being deformed.

And, the floating wedge member 3 can be engaged to the gear portion 4 without dislocation, because the contact pin portion 22, which one end 5a of the spring wire 5 formed straight of a predetermined length contacts, and the axis pin portion 23, on which another end 5b of the spring wire 5 is supported, protrude from the outer side face 2a of the wall portion 2 and near both ends of each of the wedge-shaped window portions 21 in peripheral direction, and, the spring wire 5 contacts and elastically pushes the floating wedge member 3, exposed of the wedge-shaped window portion 21, as to be pressed to the gear portion 4. And, the interval dimension T can be set small for the spring wire 5 not disposed within the pair of wall portions 2, and the thickness dimension t of te gear portion 4 can be thin. The spring wire 5 can be attached only with slight protrusions of the contact pin portion 22 and the axis pin portion 23. That is to say, the entire angle-adjustable hinge can be made thin. And, the spring wire 5 can be made easily and economically.

While preferred embodiments of the present invention have been described in this specification, it is to be understood that the invention is illustrative and not restrictive, because various changes are possible within the spirit and indispensable features.

What is claimed is:

1. An angle-adjustable hinge comprising a construction in which:

a pair of arc-shaped gear portions oscillatable around a first axis and formed outward from the first axis as a center, four wedge-shaped window portions disposed on positions in rotation symmetry for every 90° of which axis of symmetry is the first axis, and a pair of floating wedge members, disposed movably within the wedge-shaped window portions, of which one face side is a toothed face to engage with the gear portion and another face side is a contact face to contact a wedge face on an outer side of the wedge-shaped window portion to restrict the gear portion to oscillate in a direction, are provided;

the pair of floating wedge members are disposed on positions in rotation symmetry for 180° of which axis of symmetry is the first axis; and the wedge faces of the four wedge-shaped window portions are formed serially on arcs each of which center is a second axis eccentric from the first axis and on positions in rotation symmetric for every 90° of which axis of symmetry is the first axis, wherein an oscillation gear member, in which the air of gear portions, an attachment piece portion protruding from the pair of gear portions, a ring protection portion, of which center is the first axis, circularly surrounding the pair of gear portions through escape window portions to which the floating wedge members are inserted, and a connecting portion protruding from an opposite side to the attachment piece portion and connecting the pair of gear portions and the ring protection portion, are unitedly formed, is provided.

2. An angle-adjustable hinge comprising a construction in which:
- a pair of arc-shaped gear portions oscillatable around a first axis and formed outward from the first axis as a center, a pair of wedge-shaped window portions disposed on positions in rotation symmetry for 180° of which axis of symmetry is the first axis, and a pair of floating wedge members, disposed movably within the wedge-shaped window portions, of which one face side is a toothed face to engage with the gear portion and another face side is a contact face to contact a wedge face on an outer side of the wedge-shaped window portion to restrict the gear portion to oscillate in a direction, are provided; the pair of floating wedge members are disposed on positions in rotation symmetry for 180° of which axis of symmetry is the first axis; and
- the wedge faces of the two wedge-shaped window portions are formed serially on arcs each of which center is a second axis eccentric from the first axis and on positions in rotation symmetric for 180° of which axis of symmetry is the first axis,
- wherein an oscillation gear member, in which the pair of gear portions, an attachment piece portion protruding from the pair of gear portions, a ring protection portion, of which center is the first axis, circularly surrounding the pair of gear portions through escape window portions to which the floating wedge members are inserted, and a connecting portion protruding from an opposite side to the attachment piece portion and connecting the pair of gear portions and the ring protection portion, are unitedly formed, is provided.

3. An angle-adjustable hinge comprising a construction in which:
- a pair of parallel and plate-shaped wall portions, a pair of arc-shaped gear portions disposed between the wall portions and oscillatable around a first axis and formed outward from the first axis as a center, four wedge-shaped window portions disposed on each of the wall portions on positions in rotation symmetry for every 90° of which axis of symmetry is the first axis, and a pair of floating wedge members, disposed movably within the wedge-shaped window portions, of which one face side is a toothed face to engage with the gear portion and another face side is a contact face to contact a wedge face on an outer side of the wedge-shaped window portion to restrict the gear portion to oscillate in a direction, are provided;
- the pair of floating wedge members are disposed on Positions in rotation symmetry for 180° of which axis of symmetry is the first axis; and
- the wedge faces of the four wedge-shaped window portions are formed serially on arcs each of which center is a second axis eccentric from the first axis and on positions in rotation symmetric for every 90° of which axis of symmetry is the first axis,
- wherein an oscillation gear member, in which the pair of gear portions, an attachment piece portion protruding from the pair of gear portions, a ring protection portion, of which center is the first axis, circularly surrounding the pair of gear portions through escape window portions to which the floating wedge members are inserted, and a connecting portion protruding from an opposite side to the attachment piece portion and connecting the pair of gear portions and the ring protection portion, are unitedly formed, is provided.

4. An angle-adjustable hinge comprising a construction in which:
- a pair of parallel and plate-shaped wall portions, a pair of arc-shaped gear portions disposed between the wall portions and oscillatable around a first axis and formed outward from the first axis as a center, a pair of wedge-shaped window portions disposed on each of the wall portions on positions in rotation symmetry for 180° of which axis of symmetry is the first axis, and a pair of floating wedge members, disposed movably within the wedge-shaped window portions, of which one face side is a toothed face to engage with the gear portion and another face side is a contact face to contact a wedge face on an outer side of the wedge-shaped window portion to restrict the gear portion to oscillate in a direction, are provided;
- the pair of floating wedge members are disposed on:positions in rotation symmetry for 180° of which axis of symmetry is the first axis; and
- the wedge faces of the two wedge-shaped window portions are formed serially on arcs each of which center is a second axis eccentric from the first axis and on positions in rotation symmetric for 180° of which axis of symmetry is the first axis,
- wherein an oscillation gear member, in which the pair of gear portions, an attachment piece portion protruding from the pair of gear portions, a ring protection portion, of which center is the first axis, circularly surrounding the pair of gear portions through escape window portions to which the floating wedge members are inserted, and a connecting portion protruding from an opposite side to the attachment piece portion and connecting the pair of gear portions and the ring protection portion, are unitedly formed, is provided.

5. The angle-adjustable hinge as set forth in claim 3, or 4, wherein the wall portions are formed into circular plates of which center is the first axis, and a first radius dimension of the wall portion and a second radius dimension of a ring protection portion are set to be the same.

6. The angle-adjustable hinge as set forth in claim 3, or 4, wherein an interval dimension of the pair of wall portions and a thickness dimension of a ring protection portion are set to be the same.

7. The angle-adjustable hinge as set forth in claim 3, or 4, wherein:
- a contact pin portion, which one end of a spring wire formed straight of a predetermined length contacts, and an axis pin portion, on which another end of the spring wire is supported, protrude from an outer side face of the wall portion and near both ends of each of the wedge-shaped window portions in peripheral direction; and
- the spring wire contacts and elastically pushes the floating wedge member, exposed of the wedge-shaped window portion, as to be pressed to the gear portion.

* * * * *